United States Patent
Lundström

(10) Patent No.: US 10,711,679 B2
(45) Date of Patent: Jul. 14, 2020

(54) METHOD FOR RESTRICTING WORK PRODUCED BY A COMBUSTION ENGINE

(71) Applicant: Scania CV AB, Södertälje (SE)

(72) Inventor: Mikael Lundström, Hägersten (SE)

(73) Assignee: Scania CV AB, Söertälje (SE)

( * ) Notice: Subject to any disclaimer, the term of this patent is extended or adjusted under 35 U.S.C. 154(b) by 44 days.

(21) Appl. No.: 15/767,329

(22) PCT Filed: Oct. 27, 2016

(86) PCT No.: PCT/SE2016/051046
§ 371 (c)(1),
(2) Date: Apr. 10, 2018

(87) PCT Pub. No.: WO2017/074251
PCT Pub. Date: May 4, 2017

(65) Prior Publication Data
US 2019/0055873 A1    Feb. 21, 2019

(30) Foreign Application Priority Data
Oct. 28, 2015    (SE) .................... 1551385

(51) Int. Cl.
| F01N 11/00 | (2006.01) |
| F01N 3/20 | (2006.01) |
| F01N 9/00 | (2006.01) |

(52) U.S. Cl.
CPC .......... *F01N 11/007* (2013.01); *F01N 3/20* (2013.01); *F01N 3/2066* (2013.01); *F01N 9/00* (2013.01);
(Continued)

(58) Field of Classification Search
CPC .......... F01N 11/00; F01N 2900/1621; F01N 2900/1814; F01N 2900/1818
See application file for complete search history.

(56) References Cited

U.S. PATENT DOCUMENTS
| 6,363,771 B1 | 4/2002 | Liang et al. |
| 7,685,810 B2 | 3/2010 | Hirata et al. |
| (Continued) | | |

FOREIGN PATENT DOCUMENTS
| CN | 101905656 A | 12/2010 |
| CN | 102278222 A | 12/2011 |
| (Continued) | | |

OTHER PUBLICATIONS

Scania CV AB, European Application No. 16860387.6, Extended European Search Report, dated Apr. 11, 2019.
(Continued)

*Primary Examiner* — Jonathan R Matthias
(74) *Attorney, Agent, or Firm* — Moore & Van Allen PLLC; W. Kevin Ransom

(57) ABSTRACT

The present invention relates to a method for restricting work produced by combustion in a combustion chamber, wherein an aftertreatment system is arranged for reduction of at least one substance resulting from the combustion, wherein the work produced by the combustion is restricted when there is a malfunction regarding reduction of the at least one substance. The method includes: performing a first evaluation regarding the reduction of the at least one substance, when the first evaluation indicates a malfunction, performing a second evaluation regarding the reduction of the at least one substance, the second evaluation being different from the first evaluation, and restricting work produced by the combustion only when a malfunction regarding reduction of the at least one substance is indicated also by the second evaluation.

19 Claims, 4 Drawing Sheets

(52) U.S. Cl.
CPC ......... *F01N 11/00* (2013.01); *F01N 2550/02* (2013.01); *F01N 2550/03* (2013.01); *F01N 2550/05* (2013.01); *F01N 2560/026* (2013.01); *F01N 2560/14* (2013.01); *F01N 2590/08* (2013.01); *F01N 2590/10* (2013.01); *F01N 2610/02* (2013.01); *F01N 2610/148* (2013.01); *F01N 2900/0416* (2013.01); *F01N 2900/1818* (2013.01); *Y02A 50/2325* (2018.01)

(56) References Cited

U.S. PATENT DOCUMENTS

| | | | |
|---|---|---|---|
| 8,510,020 | B2 | 8/2013 | Bogema et al. |
| 8,769,935 | B2 | 7/2014 | Shaikh et al. |
| 9,626,812 | B2 | 4/2017 | See et al. |
| 9,708,952 | B2 | 7/2017 | Akiyoshi |
| 2007/0079601 | A1 | 4/2007 | Hirata et al. |
| 2015/0088362 | A1* | 3/2015 | See ............... F01N 3/208 701/29.2 |
| 2015/0096285 | A1 | 4/2015 | Andrews |
| 2016/0076423 | A1 | 3/2016 | Akiyoshi |

FOREIGN PATENT DOCUMENTS

| | | | |
|---|---|---|---|
| CN | 104508262 | A | 4/2015 |
| DE | 112013002497 | T5 | 1/2015 |
| EP | 1688599 | A1 | 8/2006 |
| JP | 2005147118 | A | 6/2005 |
| JP | 2006009606 | A | 1/2006 |
| JP | 2015001207 | A | 1/2015 |
| WO | 0075643 | A1 | 12/2000 |

OTHER PUBLICATIONS

Swedish Office Action for Swedish Patent Application No. 1551385-6 dated Jun. 27, 2018.
International Preliminary Report on Patentability for International Application No. PCT/SE2016/051046 dated May 1, 2018.
International Search Report for PCT/SE2016/051046 dated Dec. 1, 2017.
Written Opinion of the International Searching Authority for PCT/SE2016/051046 dated Dec. 1, 2017.
Scania CV AB, Korean Application No. 10-2018-7013867, Office Action, dated Jul. 19, 2019.
Scania CV AB, Chinese Application No. 201680061371.8, First Office Action, dated Sep. 4, 2019.
Scania CV AB, Korean Application No. 10-2018-7013867, Office Action, Jan. 29, 2020.

* cited by examiner

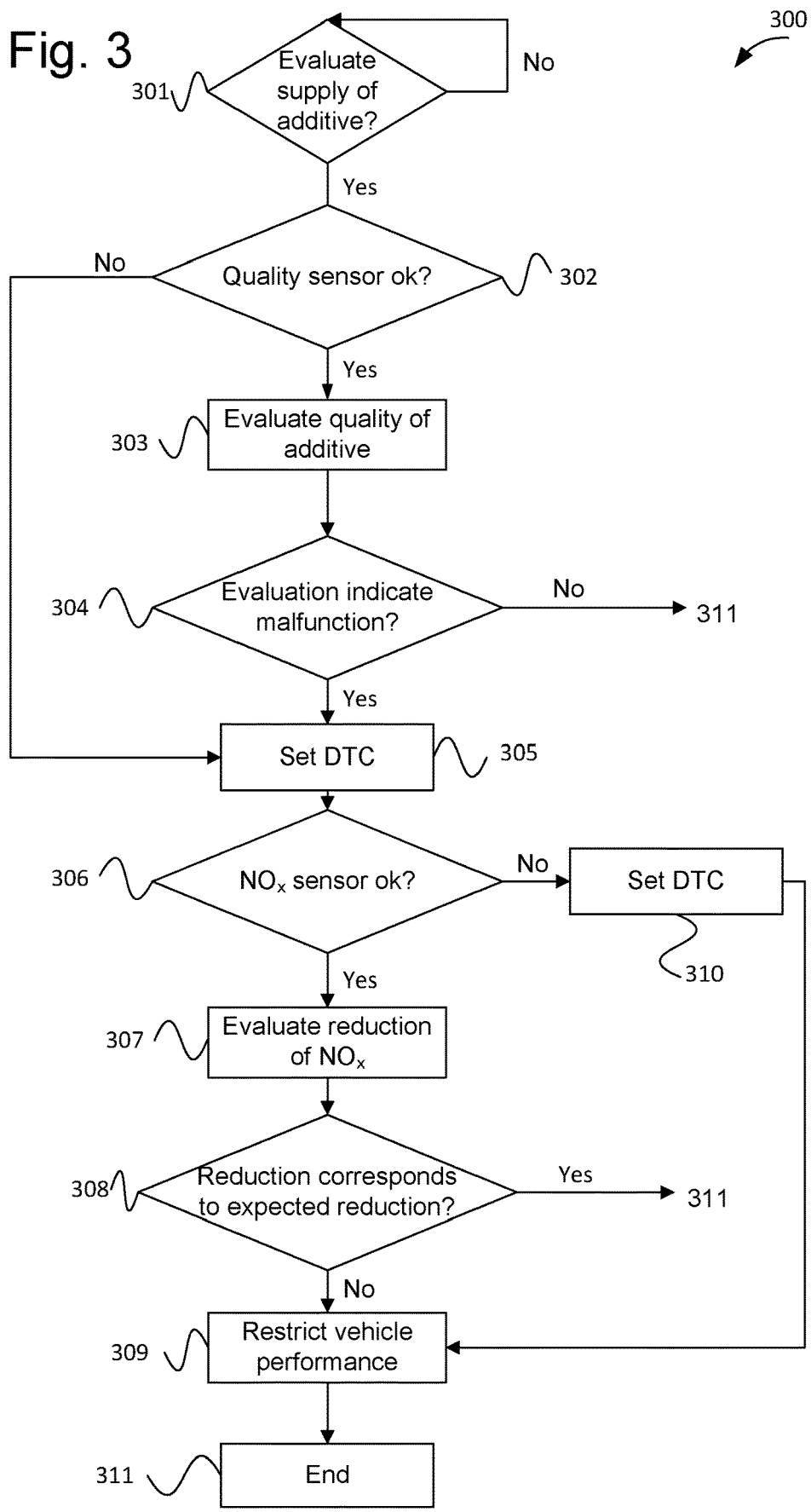

METHOD FOR RESTRICTING WORK PRODUCED BY A COMBUSTION ENGINE

CROSS-REFERENCE TO RELATED APPLICATION(S)

This application is a National Stage Application (filed under 35 § U.S.C. 371) of PCT/SE2016/051046, filed Oct. 27, 2016 of the same title, which, in turn claims priority to Swedish Application No. 1551385-6 filed Oct. 28, 2015 of the same title; the contents of each of which are hereby incorporated by reference.

FIELD OF THE INVENTION

The present invention relates to combustion processes, and in particular to a method and system and computer program product for diagnosing an aftertreatment system for treating exhaust gases resulting from combustion.

BACKGROUND OF THE INVENTION

With regard to vehicles in general, and at least to some extent heavy/commercial vehicles such as trucks, buses and the like, there is constantly ongoing research and development with regard to increasing fuel efficiency and reducing exhaust emissions.

This is often at least partly due to growing governmental concern in pollution and air quality, e.g. in urban areas, which has also led to the adoption of various emission standards and rules in many jurisdictions.

These emission standards often consist of requirements that define acceptable limits for exhaust emissions of vehicles being provided with combustion engines. For example, the exhaust levels of e.g. nitric oxides ($NO_x$), hydrocarbons (HC), carbon monoxide (CO) and particles are regulated for most kinds of vehicles in these standards.

The undesired emission of substances can be reduced by reducing fuel consumption and/or through the use of aftertreatment (purifying) of the exhaust gases that results from the combustion process.

Exhaust gases from the combustion engine can, for example be treated through the use of a so-called catalytic process. There exist various kinds of catalytic converters, where different types can be used for different kinds of fuel and/or for treatment of different kinds of substances occurring in the exhaust gas stream. With regard to at least nitric oxides $NO_x$ (such as, for example, nitric oxide NO and nitric dioxide $NO_2$, respectively) heavy vehicles often comprises a method where an additive is supplied to the exhaust gas stream. The additive is supplied in order to, usually through the use of a catalytic converter, reduce the presence of nitric oxides $NO_x$ to less pollutive substances (mainly nitrogen and water vapor).

One common kind of catalytic converter that is used in $NO_x$ reduction, where an additive, oftentimes urea based, is added to the exhaust gas stream, is Selective Catalytic Reduction (SCR) catalytic converters.

In the supplying of an additive it is essential that the amount of additive that is supplied to the exhaust gas stream is not too great or too small. Consequently, it is desirable that the supplied amount of additive corresponds to an expected amount of additive. Further, with regard to the reduction it is also important that the additive consists of an additive of an expected kind.

The chemical composition of an additive can be evaluated, for example, through the use of a quality sensor. When the quality sensor indicates a deviating quality of the additive, and/or broken sensor, regulations may require that vehicle performance restrictive measures are being taken. That is, the driver is induced to ensure that additive of appropriate quality and amount is supplied to the exhaust gas stream.

SUMMARY OF THE INVENTION

It is an object of the present invention to provide a method and system that reduces the occurrence of unduly restrictions of vehicle performance due to irregularities in the operation of an aftertreatment system. This object is achieved by a method according to claim 1.

According to the present invention, it is provided a method for restricting work produced by combustion in a combustion chamber, wherein an aftertreatment system is arranged for reduction of at least one substance resulting from said combustion, wherein the work produced by said combustion is restricted when there is a malfunction regarding reduction of said at least one substance. The method includes:

performing a first evaluation regarding the reduction of said at least one substance, when said first evaluation indicates a malfunction, performing a second evaluation regarding the reduction of said at least one substance, said second evaluation being different from said first evaluation, and restricting work produced by said combustion only when a malfunction regarding reduction of said at least one substance is indicated also by said second evaluation.

As was mentioned above, the presence of at least some substances (as is explained below, in the present description and claims, the term substance includes compounds as well) in an exhaust gas stream resulting from combustion can be reduced through the supply of an additive to the exhaust gas stream. The additive then reacts with one or more of the substances occurring in the exhaust gas stream to thereby form less hazardous substances.

For example, the supply of additive can be used to reduce the concentration of nitric oxides $NO_x$ or other substances in the exhaust gases from combustion. It is, however, important that the additive is supplied to the exhaust gas stream in a proportion that corresponds to the presence of the one or more substances/compositions that is to be reduced in order to achieve the desired effect. It is also important that the additive is of a kind that is capable of performing the desired reduction. If a wrong kind of additive, and/or if the supplied amount of additive is too small in relation to the presence of the substance/composition to be reduced, there is a major risk that an undesired surplus of the substance will still remain after the reduction and be emitted into the surroundings.

Conversely, if the amount of additive being supplied to the exhaust gas stream is high in relation to the at least one substance/composition to be reduced, the supply of additive may cause a surplus of other undesired substances instead. For example, with regard to $NO_x$ reduction using urea based additive, a surplus of ammonium may be emitted into the surroundings. Ammonium is classified as a hazardous substance, and emissions of ammonium are also often regulated.

With regard to the additive the required supply, and hence consumption, can be relatively high in order to obtain the desired reduction. For this reason the cost for the consumption of additive, e.g. when used in a commercial vehicle, may have a significant impact on the vehicle economy. This may give rise to temptations to replace relatively expensive additive with less expensive liquids such as e.g. water. The use of such alternative liquids will, almost certainly, have a detrimental effect on the reduction of the exhaust emissions.

Therefore, in order to ensure that an additive of a desired quality and amount is provided to the exhaust gas stream, and to avoid replacement of additive with less suitable, but economically more favorable, alternatives, there are, presently and/or upcoming, at least in some jurisdictions requirements regarding onboard diagnostics (OBD). That is, the vehicle is required to be able to detect deviations with regard to quality of the additive and its supply during vehicle operation.

For example, in at least some jurisdictions it is, or will be, required that the vehicle is capable of evaluating, diagnosing, a property of the additive directly, such as e.g. chemical composition. This can be achieved, for example through the use of suitable sensor means, such as e.g. a quality sensor, which can be arranged in the tank containing the additive, in the following referred to as dosing tank. By means of the quality sensor the chemical composition of the additive can be evaluated.

Further, in case a malfunction with regard to the reduction of the substance to be reduced is detected, the vehicle control system will be required to take restrictive measures regarding e.g. vehicle performance, oftentimes in terms of limiting the work produced by combustion. Restrictive measures of this kind are often arranged to be effected only after some time has lapsed. For example, the vehicle control system may be arranged to reduce available power and/or maximum allowed vehicle speed some suitable number of hours after the detection of a malfunction, the time limit given e.g. to allow the vehicle to return home for service. Restrictive measures of this kind, consequently, provide the driver/owner with an inducement to use additive of an appropriate kind. For example, a malfunction with regard to the reduction may be considered to be present if the chemical composition of the additive deviates from accepted compositions, and/or if it is determined that the quality sensor is not working properly.

Consequently, the vehicle will, in general, be required to be taken to a repair shop for service to avoid undesired effects of the restrictive measures. However, if a detected malfunction in reality turns out to be erroneous, e.g. if the quality sensor is in fact operating properly, or if the quality of the additive in reality is acceptable, restrictive measures according to the above may lead to costs and vehicle downtime that are uncalled for.

The present invention provides a method for reducing the occurrence of restricted vehicle performance due to a negative diagnostic evaluation in situations when the reduction is in fact working properly.

According to the invention, this is accomplished by diagnosing reduction in the aftertreatment system using at least two evaluations. When one of these two evaluations indicates an occurrence of a malfunction it is required that also the other of said two evaluations indicates a malfunction in order to take restrictive measures according to the above.

For example, when the reduction in the aftertreatment system involves the supply of additive, at least two evaluations are performed with regard to the reduction, and restrictive measures are only taken when both of these evaluations indicate that the reduction is not working properly. In this way, situations where restrictive measures are taken e.g. due to a faulty sensor can be avoided.

According to one embodiment, the first evaluation involves an evaluation of the supply of additive using a quality sensor, where the quality sensor is arranged to diagnose at least one property with regard to said additive, such as e.g. the chemical composition. If it is determined that the evaluation using the quality sensor indicates a malfunction, restrictive measures are not initiated as in the prior art. That is, it is not sufficient that the quality sensor is not working properly, or indicates poor quality of the additive to initiate restrictive measures. Instead, it is required that at least one second evaluation also indicates a malfunction with regard to the reduction. For example, the reduction can be estimated using a sensor such as e.g. a $NO_x$ sensor measuring the presence of the substance to be reduced. Consequently, contrary to the prior art, the present invention does not automatically initiate restrictions only because the quality sensor indicates a malfunction, but it is also required that a second evaluation of the reduction indicates a malfunction regarding the reduction.

Further characteristics of the present invention and advantages thereof are indicated in the detailed description of the invention set out below and the attached drawings.

BRIEF DESCRIPTION OF THE DRAWINGS

The invention will be illustrated in more detail below, along with the enclosed drawings:

FIG. 3 illustrates an exemplary method according to one embodiment of the present invention.

DETAILED DESCRIPTION OF THE INVENTION

In the following detailed description the present invention will be exemplified for a vehicle. The invention is, however, applicable also in other kinds of transportation means, such as air and water crafts. The invention is also applicable in fixed installations.

Furthermore, the concept of the present invention is not limited to the supply of additive, but is applicable for any kind of reduction in an aftertreatment system, e.g. using any kind of catalytic converter. Consequently, the invention is applicable also for reductions that do not involve the supply of an additive. Further, the present invention is exemplified below for a urea based additive for reduction of nitric oxides. The present invention is, however, applicable for any kind of suitable additive, where the additive can be arranged for reduction of any substance/compound, and hence not necessarily nitric oxides.

Further, in the present description and the appended claims the expression "substance" is defined to include chemical compounds as well as mixtures.

Figure 1A:
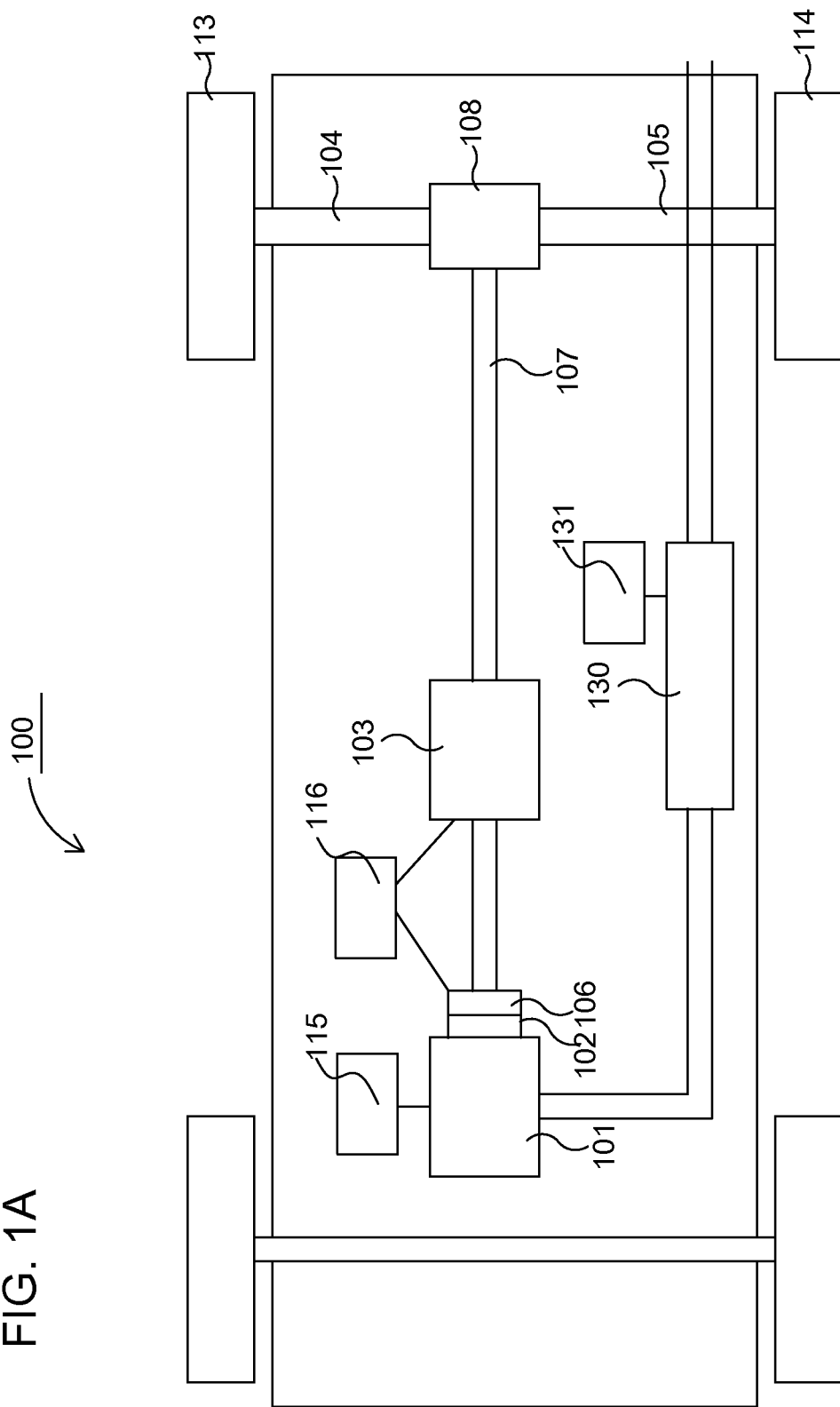
FIG. 1A illustrates a power train of an exemplary vehicle in which the present invention advantageously can be utilized.

FIG. 1A schematically depicts a power train of an exemplary vehicle 100. The power train comprises a power source, in the present example a combustion engine 101, which, in a conventional manner, is connected via an output shaft of the combustion engine 101, normally via a flywheel 102, to a gearbox 103 via a clutch 106. An output shaft 107 from the gearbox 103 propels drive wheels 113, 114 via a final drive 108, such as a common differential, and drive axles 104, 105 connected to said final drive 108.

The combustion engine 101 is controlled by the vehicle control system via a control unit 115. The clutch 106 and gearbox 103 are also controlled by the vehicle control system by means of a control unit 116.

FIG. 1A, consequently, discloses a powertrain of a specific kind, but the invention is applicable in any kind of power trained and also e.g. in hybrid vehicles. The disclosed vehicle further comprises an aftertreatment system 130 for aftertreatment (purifying) of exhaust gases that results from combustion in the combustion engine 101. The functions of aftertreatment system 130 are controlled by means of a control unit 131.

The aftertreatment system 130 can be of various kinds and designs, and according to the disclosed embodiment an additive is supplied to the exhaust gas stream. An example of an aftertreatment system 130 in which the present invention can be utilized is shown more in detail in FIG. 2, and in the disclosed exemplary embodiment the aftertreatment system 130 comprises a selective catalytic reduction (SCR) catalytic converter 201. The aftertreatment system can also comprise further non-disclosed components, such as, for example, further catalytic converters and/or particle filters which can be arranged upstream or downstream the SCR catalytic converter 201.

The supply of additive can, according to the above, for example be used in the reduction of the concentration of nitric oxides $NO_x$ in the exhausts from the combustion engine through the use of an SCR catalytic converter.

This additive can, as according to the disclosed embodiment, for example be a urea based additive and e.g. consist of AdBlue which constitutes a frequently used additive and which consists of a mixture of approximately 32.5% urea dissolved in water. Urea forms ammonium when heated, which then reacts with nitric oxides $NO_x$ in the exhaust gas stream. The present invention is applicable when using AdBlue, as well as when using any other urea based additive. As was mentioned above, the invention is also applicable when using any kind of additive and irrespective of the substance in the exhaust gas stream that the additive is arranged to reduce.

Figure 2:
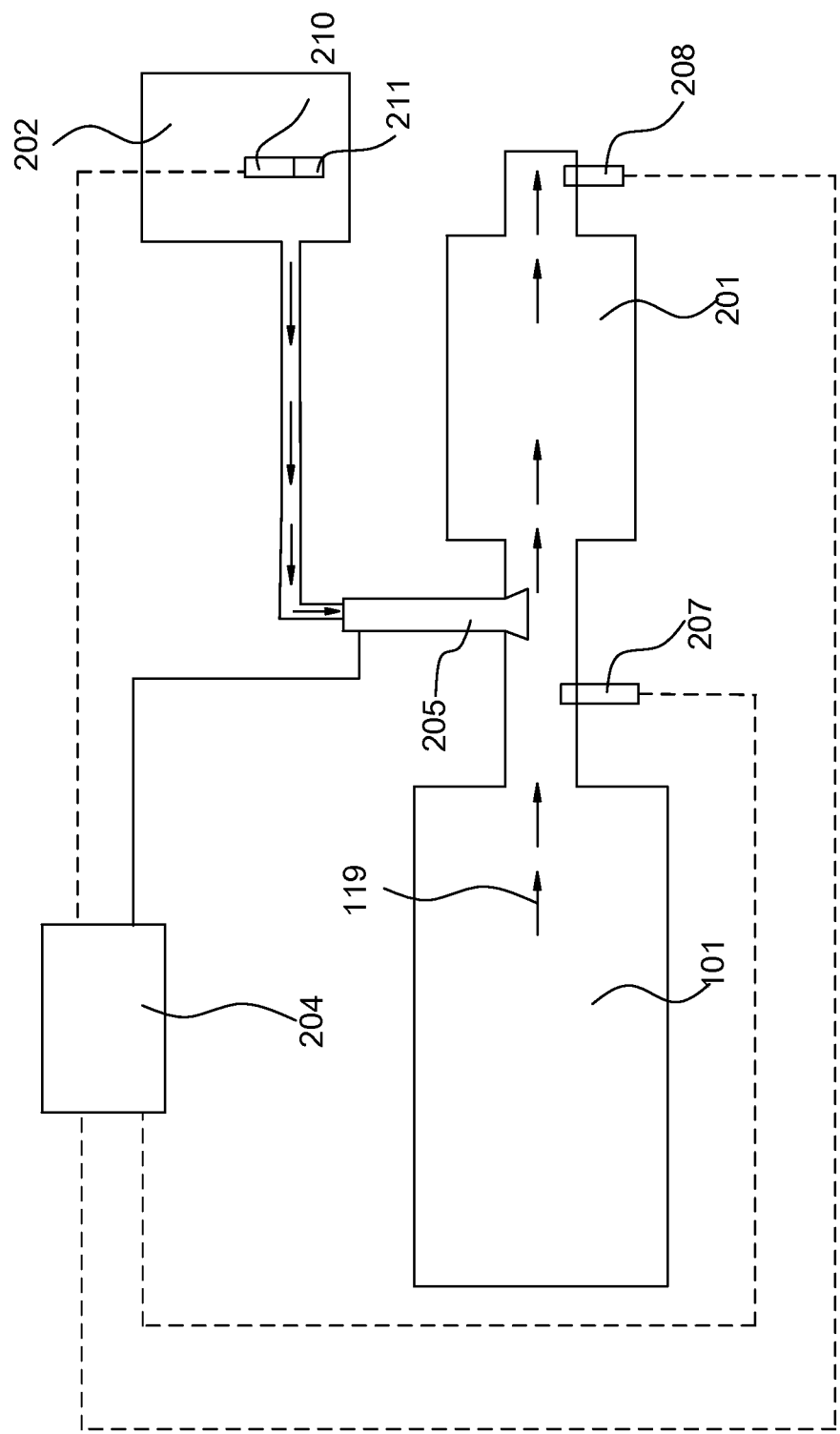
FIG. 2 illustrates an example of an aftertreatment system where a supply of additive is utilized and with which the present invention advantageously can be utilized.

Apart from said catalytic converter 201, FIG. 2 further discloses a urea dosing system (UDS), which comprises a urea, or dosing, tank 202, which is connected to an injection nozzle 205 through the use of which additive is injected into the exhaust gas stream 119. The dosing of urea is controlled by a UDS control unit 204, which generates control signals for controlling the supply of additive so that a desired amount is injected into the exhaust gas stream 119 from the tank 202 using the injection nozzle 205. An armature 210 is arranged in the tank 202 and comprises a quality sensor 211 for diagnosing the supply of additive.

Dosing systems for the supply of additive are in general well described in the prior art, and the precise manner in which the supply of additive is dosed/performed is therefore not described in detail herein. The present invention relates to a method for reducing the occurrence of restrictions regarding work produced by combustion, and this is accomplished according to the present example by diagnosing the supply of additive, where the diagnostics can be performed with regard to the chemical composition of additive and/or actual reduction of the substance to be reduced. Further/ other tests can also be arranged to be performed when diagnosing the supply of additive.

Requirements regarding onboard diagnostics (OBD) are becoming increasingly stricter to ensure that vehicles fulfil e.g. legislated exhaust emission standards. Such requirements include the capability of diagnosing supply of additive during vehicle operation. This can, for example, be accomplished by estimating the conversion rate, i.e. reduction rate, of the substance to be reduced, such as e.g. $NO_x$. The conversion rate can, for example be estimated by comparing a presence of $NO_x$ upstream the supply of additive with the presence of $NO_x$ downstream the SCR catalytic converter 201. In this way, it can be determined whether a desired conversion, i.e. reduction, is taking place and thereby whether the supply of additive can be assumed to be performed in a desired manner. The presence of $NO_x$ upstream the supply of additive and downstream the catalytic converter 201, respectively, can, for example, be determined through the use of $NO_x$ sensors 207, 208 (see FIG. 2). The presence of NOx upstream the supply of additive can also be determined e.g. by means of a model representation, e.g. taking combustion engine operation parameters into account as is known per se.

The supply of additive can also be more directly evaluated e.g. by means of an analysis of the additive. This can be accomplished, for example, through the use of the quality sensor 211 being arranged in the dosing tank, where e.g. the chemical composition of the additive can be analysed.

In addition to performing diagnostics, oftentimes there are, or will be introduced, legislation that require the vehicle to impose vehicle performance restrictions when diagnostics indicate that the quality of the supply of additive deviates from an approved quality. This can be accomplished, for example, by reducing available power and/or maximum speed some time after the malfunction is detected. However, since restrictions of this kind may be associated with considerable costs, it is desirable that restrictions are only imposed when actual malfunctions are present.

The present invention provides a method that reduces the risk of situations arising where restrictions are imposed because a fault is indicated, but where in reality no fault exist. An exemplary method 300 of the present invention is shown in FIG. 3, which method can be implemented at least partly e.g. in the control unit 204 for controlling of the urea dosing system. As indicated above, the functions of a vehicle are, in general, controlled by a number of control units, and control systems in vehicles of the disclosed kind generally comprise a communication bus system consisting of one or more communication buses for connecting a number of electronic control units (ECUs), or controllers, to various components on board the vehicle. Such a control system may comprise a large number of control units, and the control of a specific function may be divided between two or more of them.

For the sake of simplicity, FIGS. 1A, 2 depicts only control units 115-116, 130, 204, but vehicles 100 of the illustrated kind are often provided with significantly more control units, as one skilled in the art will appreciate. Control units 115-116, 130, 204 are arranged to communicate with one another and various components via said communication bus system and other wiring, partly indicated by interconnecting lines in FIG. 1A.

The present invention can be implemented in any suitable control unit in the vehicle 100, and hence not necessarily in the control unit 204. The diagnostics of the urea dosing according to the present invention will usually depend on signals being received from other control units and/or vehicle components, and it is generally the case that control units of the disclosed type are normally adapted to receive sensor signals from various parts of the vehicle 100. The control unit 204 will, for example, receive signals from e.g. quality sensor 211 and/or $NO_x$ sensors 207, 208. Control units of the illustrated type are also usually adapted to deliver control signals to various parts and components of the vehicle, e.g. to the engine control unit or other suitable control unit when tests indicate that performance of the vehicle should be restricted.

Control of this kind is often accomplished by programmed instructions. The programmed instructions typically consist of a computer program which, when executed in a computer or control unit, causes the computer/control unit to exercise the desired control, such as method steps according to the present invention. The computer program usually constitutes a part of a computer program product, wherein said computer program product comprises a suitable storage medium 121 (see FIG. 1B) with the computer program 126 stored on said storage medium 121. The computer program can be stored in a non-volatile manner on said storage medium. The digital storage medium 121 can, for example, consist of any of the group comprising: ROM (Read-Only Memory), PROM (Programmable Read-Only Memory), EPROM (Erasable PROM), Flash memory, EEPROM (Electrically Erasable PROM), a hard disk unit etc., and be arranged in or in connection with the control unit, whereupon the computer program is executed by the control unit. The behavior of the vehicle in a specific situation can thus be adapted by modifying the instructions of the computer program.

Figure 1B:
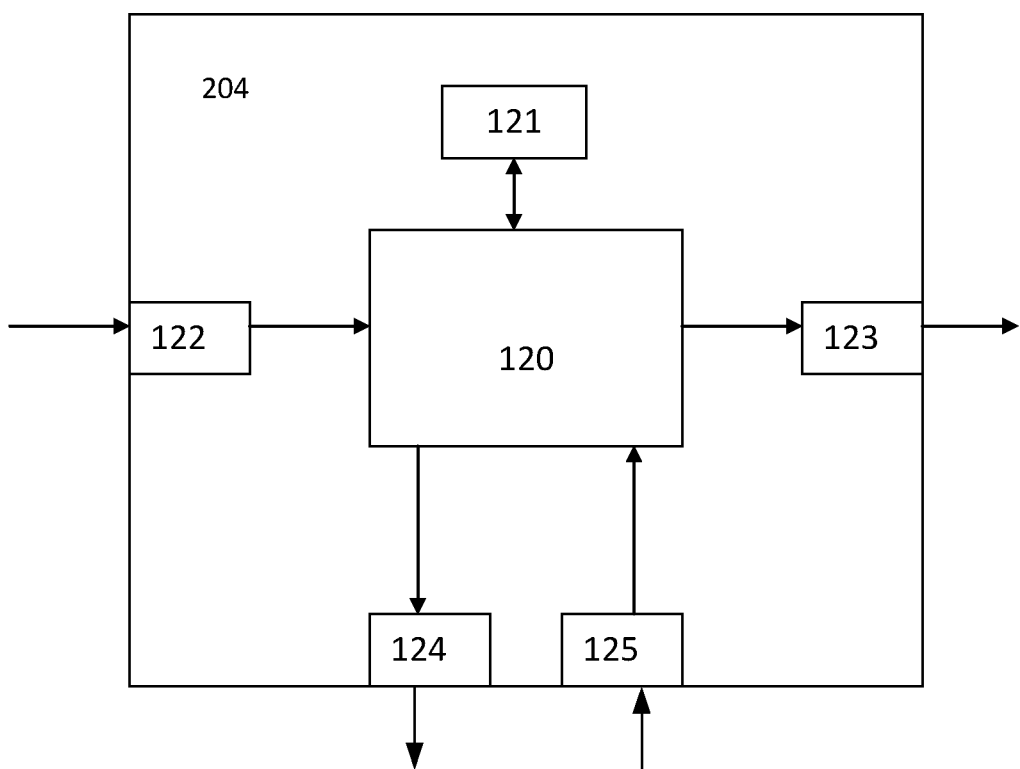
FIG. 1B illustrates an example of a control unit in a vehicle control system.

An exemplary control unit (the control unit 204) is shown schematically in FIG. 1B, wherein the control unit can comprise a processing unit 120, which can consist of, for example, any suitable type of processor or microcomputer, such as a circuit for digital signal processing (Digital Signal Processor, DSP) or a circuit with a predetermined specific function (Application Specific Integrated Circuit, ASIC). The processing unit 120 is connected to a memory unit 121, which provides the processing unit 120, with e.g. the stored program code 126 and/or the stored data that the processing unit 120 requires to be able to perform calculations. The processing unit 120 is also arranged so as to store partial or final results of calculations in the memory unit 121.

Furthermore, the control unit 204 is equipped with devices 122, 123, 124, 125 for receiving and transmitting input and output signals, respectively. These input and output signals can comprise waveforms, pulses or other attributes that the devices 122, 125 for receiving input signals can detect as information for processing by the processing unit 120. The devices 123, 124 for transmitting output signals are arranged so as to convert calculation results from the processing unit 120 into output signals for transfer to other parts of the vehicle control system and/or the component (s) for which the signals are intended. Each and every one of the connections to the devices for receiving and transmitting respective input and output signals can consist of one or more of a cable; a data bus, such as a CAN bus (Controller Area Network bus), a MOST bus (Media Oriented Systems Transport) or any other bus configuration, or of a wireless connection.

Returning to the exemplary method 300 illustrated in FIG. 3, the method starts in step 301, where it is determined whether the reduction of a substance, such as e.g. $NO_x$, is to be diagnosed. The method remains in step 301 for as long as this is not the case. The method continues to step 302 when it is determined that the reduction of a substance is to be diagnosed. The transition from step 301 to step 302 can, for example, be initiated according to various criteria. For example, the diagnostics can be arranged to be performed at regular intervals. Also, the diagnostics can be arranged to be performed e.g. each time the combustion engine 101 is started and/or each time there is an indication that a refill of additive has taken place. The transition can also be arranged to be performed if there is an indication of malfunctioning reduction of $NO_x$.

In step 302 a first evaluation regarding the reduction of a substance is initiated. This evaluation can, for example, consist of any of the above described tests and according to the exemplary embodiment a diagnostic of the supply of additive using the quality sensor 211 is performed.

In step 302 it is first determined whether it can be assumed that the quality sensor 211 is working properly, or whether the sensor 211 is assumed to be malfunctioning. This can, for example, be determined by the magnitude of received sensor signals, and/or presence or lack of sensor signals. When the quality sensor is determined to be working properly, the method continues to step 303. When it is concluded that the quality sensor 211 is not working properly, the method continues to step 305, where a diagnostic trouble code (DTC) with regard to the malfunctioning sensor is set. The method then continues to step 306 according to the below.

When it is concluded in step 302 that the quality sensor 211 is assumed to be working properly the method continues to step 303 where the quality of the additive is evaluated based on the sensor signals received from quality sensor 211. The method then continues to step 304, where it is determined whether this evaluation indicates that the supply of an additive deviates from an expected supply in some aspect. For example, the chemical composition of the additive can be diagnosed in step 303. When it is determined in step 304 that there is a deviation with regard to chemical composition, the method continues to step 305. Otherwise the method is ended in step 311, since the reduction is considered to function properly.

With regard to the determination of the chemical composition, the quality sensor 211 can, for example, be arranged such that the speed of sound in the additive is measured. This can be accomplished by transmitting a signal towards a surface at a known distance and measure the time it takes for the signal to travel there and back. Quality sensors of this kind are known in the art, and it is generally the case that the speed of sound in a liquid changes with the composition of the liquid. This means that a determination of the speed of sound in the liquid in the dosing tank can be used to evaluate the chemical composition of the additive by comparing the obtained speed of sound with an expected speed of sound, where a malfunction can be assumed e.g. when the deviation from an expected value exceeds some suitable limit.

Alternatively, or in addition, the speed of sound can be stored in the vehicle control system for a number of different concentrations/liquids, so that an obtained speed of sound can be compared with stored values and translated into a corresponding concentration of e.g. urea, or assumed liquid. When the comparison indicates use of a liquid that does not fulfil set requirements, this can be used as an indication of a malfunction. However, the deviation may be caused e.g. by frozen additive in the tank, and hence the additive may be of proper quality also in situations where the sensor indicates otherwise.

Consequently, a quality sensor, such as a urea quality sensor, can be used to determine the quality of additive and thereby diagnose of the supply of additive. If it is concluded in step 304 that the supply of additive is not working as required the method continues to step 305. As was mentioned above, a diagnostic trouble code (DTC) can be set in step 305, in this case indicating e.g. bad quality of the additive. The causes resulting in activated trouble codes in step 305 can then be looked into e.g. the next time the vehicle is taken in for service. At this stage, however, no restrictive measures are being taken, and hence service must not necessarily be performed within a certain time.

As was mentioned, when there is a deviation with regard to the chemical composition, the method continues to step 306 for further evaluation. That is, no restrictive measures with regard to vehicle performance are taken solely based on the evaluation performed in steps 302-304. Instead, a second evaluation of the reduction is performed.

The second evaluation can, for example, be a determination of the current conversion rate, or reduction rate, of the substance to be reduced. According to the present example a determination of the $NO_x$ reduction rate is performed. This can be performed, for example, according to the above by estimating the presence of $NO_x$ before and after the supply of additive through the use of sensors 207, 208. These estimations can be compared and a conversion rate be calculated, which can then be compared with the assumed supply of additive.

In step 306 it is first determined whether it can be assumed that the $NO_x$ sensors 207, 208 are working properly, or whether either or both of the sensors 207, 208 is/are assumed to be malfunctioning. This can, for example, be determined by the magnitude of received sensor signals, and/or presence or lack of sensor signals. When both $NO_x$ sensors 207, 208 are determined to be working properly, the method continues to step 307. When it is concluded that at least one of the $NO_x$ sensors 207, 208 is not working properly, the method continues to step 310. In step 310 an appropriate trouble code is activated, and the method then continues to step 309 for activating restrictive measures, since the second evaluation of the reduction has not been capable of indicating otherwise than the first evaluation.

As was mentioned above, the presence of $NO_x$ upstream the supply of additive can be estimated through the use of any suitable model of the combustion engine and e.g. the amount of fuel that is provided to the combustion engine instead. In this case, only the operation of $NO_x$ sensor 208 needs to be determined in step 306.

If the $NO_x$ sensors (or sensor) are determined to operate properly, the $NO_x$ reduction is calculated/estimated in step 307. If it is determined that e.g. an estimated reduction rate corresponds to an expected reduction rate to some suitable extent e.g. based on an assumed supply of additive, step 308, this constitutes an indication that the system is working properly after all. That is, sensor signals being delivered by the quality sensor 211 do not reflect an actual status of the system operation. Therefore, in this case, no restrictive measures are being taken, and the method is ended in step 311. Diagnostic trouble codes according to the above may remain set for later diagnostics.

If, on the other hand, it is determined in step 308 that the estimated conversion rate does not correspond to an expected conversion rate the method continues to step 309, where further diagnostic error codes can be activated, e.g. with regard to the $NO_x$ reduction. Restrictive measures are then taken in step 309. These measures can, for example, be arranged to follow the legislative rules that apply in the region in which the vehicle presently is travelling. The measures may constitute a restriction where the work produced by the combustion engine is limited, e.g. by restricting the maximum available power and/or maximum vehicle speed. The limitations may be arranged to be applied some suitable number of hours after the error is detected to allow the vehicle to be driven to a suitable service shop/return home. For example, according to the European EURO VI legislation the restrictive measures are such that actual limitation of combustion engine work is started 20 hours after the restrictive measure is taken. The method is then ended in step 311.

The present invention, consequently, provides a solution where restrictive measures are not taken solely based on a single evaluation but, instead, at least two evaluations indicating a malfunction are required in order to actually take restrictive measures. For as long as only one evaluation indicates a malfunction this is duly noted by setting a suitable diagnostic trouble code, and possibly store related data, but no restrictions are applied. Consequently, e.g. a malfunctioning quality sensor is not in itself sufficient to take restrictive measures. At least one second indication of a fault is required to initiate restrictions of vehicle performance.

According to the above, the invention has been exemplified using particular kinds of evaluations. As is obvious to a person skilled in the art, the order in which such evaluations are performed is not relevant to the present invention, and the evaluations can performed in any order. For example, with regard to the above example, an evaluation using e.g. a $NO_x$ sensor can first be made, and if this evaluation indicates a malfunction in the reduction the quality sensor can be used to verify this, or as an indication of a possibly malfunctioning NOx sensor and not a malfunctioning reduction.

Furthermore, the above evaluations only constitute examples, and any kind of suitable evaluations can be used instead.

Consequently, the general aspect of the present invention is a method where any suitable function of an aftertreatment system is evaluated through the use of at least two evaluations, and where restrictions regarding vehicle performance are imposed only when two independent evaluations relating to the same functionality indicates a malfunctioning system. Consequently, according to the present invention, a diagnostic trouble code representing e.g. a malfunctioning quality sensor, or a diagnostic trouble code representing e.g. a malfunctioning $NO_x$ sensor, will not result in restrictions of vehicle performance based on this trouble code alone, but further indications are required to trigger a restriction.

Finally, the present invention has been exemplified for a vehicle. The invention is, however, applicable in any kind of craft, such as, e.g., aircrafts, watercrafts and spacecrafts. The invention is also applicable for use in combustion plants. Also, the aftertreatment system may comprise further components such as one or more particle filters, one or more oxidation catalytic converters as is known per se. It is also contemplated that the aftertreatment system may comprise more than one SCR catalytic converter.

The invention claimed is:

1. A method for restricting work produced by a combustion in at least one combustion chamber, wherein an aftertreatment system is arranged for reduction of at least one substance resulting from said combustion, wherein the work produced by said combustion is restricted when there is a malfunction regarding reduction of said at least one substance, the method comprising:
   performing a first evaluation regarding the reduction of said at least one substance to determine whether a malfunction exists;
   when said first evaluation indicates that a malfunction exists, performing a second evaluation regarding the reduction of said at least one substance to determine if the second evaluation also independently indicates that the malfunction exists, said second evaluation being different from said first evaluation; and restricting work produced by said combustion only when a malfunction regarding reduction of said at least one substance is indicated by each of said first and said second evaluation.

2. A method according to claim 1 further comprising:
reducing said at least one substance by supplying an additive to an exhaust gas stream resulting from said combustion.

3. A method according to claim 2 further comprising:
supplying said first additive upstream a first catalytic converter.

4. A method according to claim 3, wherein said first catalytic converter is a selective catalytic reduction (SCR) catalytic converter.

5. A method according to claim 2, wherein one of said first evaluation and said second evaluation includes:
evaluating the additive using a quality sensor, said quality sensor arranged to evaluate at least one property with regard to said additive.

6. A method according to claim 5, wherein said at least one property is a chemical composition of said additive.

7. A method according to claim 5, wherein said evaluation of said supply of additive indicates a malfunction when sensor signals from said quality sensor indicates an insufficient quality of said additive.

8. A method according to claim 5, wherein said evaluation of said supply of additive indicates a malfunction when said evaluation indicates improper function of said quality sensor.

9. A method according to claim 2, wherein one of said first evaluation and said second evaluation includes:
by means of at least one second sensor, estimating a reduction of said at least one substance; and
wherein a malfunction regarding the reduction of said at least one substance is indicated when the estimated reduction is below a first reduction.

10. A method according to claim 9, further comprising:
estimating the reduction by comparing a presence of said at least one substance upstream said supply of additive with a presence of said at least one substance downstream said supply of additive.

11. A method according to claim 10, wherein said additive is supplied upstream of a catalytic converter and said presence of said at least one substance is determined downstream said catalytic converter.

12. A method according to claim 1, wherein said restriction of said combustion is a restriction of the maximum power delivered by said combustion.

13. A method according to claim 1, wherein said at least one combustion chamber is a combustion chamber of a combustion engine in a vehicle, said restriction of said combustion being such that a maximum power of said combustion engine is restricted and/or such that the maximum speed of said vehicle is limited to a first vehicle speed.

14. A method according to claim 1, further comprising:
restricting said work produced by said combustion only when a first period of time has lapsed since insufficient reduction of said at least one substance is indicated also by said second evaluation.

15. A method according to claim 14, wherein said first period of time is at least one hour.

16. A method according to claim 1, wherein said at least one substance comprising at least nitric oxides.

17. A computer program product comprising program code stored on a non-transitory computer-readable medium, said computer program product for restricting work produced by combustion in at least one combustion chamber, wherein an aftertreatment system is arranged for reduction of at least one substance resulting from said combustion, wherein the work produced by said combustion is restricted when there is a malfunction regarding reduction of said at least one substance, said computer program product comprising computer instructions to cause one or more computer processors to perform the following operations:
performing a first evaluation regarding the reduction of said at least one substance to determine whether a malfunction exists;
when said first evaluation indicates that a malfunction exists, performing a second evaluation regarding the reduction of said at least one substance to determine if the second evaluation also independently indicates that the malfunction exists, said second evaluation being different from said first evaluation; and
restricting work produced by said combustion only when a malfunction regarding reduction of said at least one substance is indicated by each of said first and said second evaluation.

18. A system for restricting work produced by combustion in a combustion chamber, wherein an aftertreatment system is arranged for reduction of at least one substance resulting from said combustion, wherein the work produced by said combustion is restricted when there is a malfunction regarding reduction of said at least one substance, the system comprising:
means for performing a first evaluation regarding the reduction of said at least one substance to determine whether a malfunction exists;
when said first evaluation indicates that a malfunction exists, performing a second evaluation regarding the reduction of said at least one substance to determine if the second evaluation also independently indicates that the malfunction exists, said second evaluation being different from said first evaluation; and
means for restricting work produced by said combustion only when a malfunction regarding reduction of said at least one substance is indicated by each of said first and said second evaluation.

19. A vehicle comprising a system for restricting work produced by combustion in a combustion chamber, wherein an aftertreatment system is arranged for reduction of at least one substance resulting from said combustion, wherein the work produced by said combustion is restricted when there is a malfunction regarding reduction of said at least one substance, the system comprising:
means for performing a first evaluation regarding the reduction of said at least one substance to determine whether a malfunction exists;
when said first evaluation indicates that a malfunction exists, performing a second evaluation regarding the reduction of said at least one substance to determine if the second evaluation also independently indicates that the malfunction exists, said second evaluation being different from said first evaluation; and
means for restricting work produced by said combustion only when a malfunction regarding reduction of said at least one substance is indicated by each of said first and said second evaluation.

* * * * *